Patented Dec. 15, 1953

2,662,842

UNITED STATES PATENT OFFICE 2,662,842

METHOD OF PRODUCING ALCOHOL

Leo M. Christensen, Lincoln, Nebr.

No Drawing. Application August 7, 1950,
Serial No. 178,169

12 Claims. (Cl. 195—15)

This invention relates to a method of producing alcohol from cereal grains, more particularly to a method of producing alcohol from cereal grains in which the germ fraction of the grain is submitted to special processing.

As is known, corn and wheat constitute major source materials for the production of fermentation alcohol. The processes heretofore employed involved essentially cooking the ground, starchy material to sterilize the mass and gelatinize the starch, then saccharifying the starch by means of an acid or an enzymatic material such as barley malt or mold bran, then yeasting to convert the fermentable sugars to alcohol and recovering the alcohol by distillation with accompanying recovery of the proteinaceous byproduct in the form of distillers dried grain.

It has long been recognized by those skilled in the art that the amount of alcohol produced by orthodox methods was considerably less than that which was theoretically possible as calculated on the carbohydrate content of the starting material.

In point of fact conventional grain fermentation processes are notably inefficient. For example, utilizing 90% corn and 10% malt in the grain bill the average yield of alcohol is slightly under 2.50 wine gallons of 190° proof alcohol per bushel (56 lbs., 12% moisture) of grain processed. This is equivalent to a yield of 31.6 grams of ethanol per 100 grams of dried grains. Due to an incomplete knowledge of the starch and other carbohydrates present in the grains as well as uncertainties inherent in the present analytical methods for their determination, it is not possible to derive an exact figure for the amount of alcohol that is theoretically obtainable from grain. However, where a good quality corn and malt are used in a grain bill of 90% corn and 10% malt, such grain mixture should give at least 65% fermentable carbohydrates calculated as starch, assuming 66% starch in the corn, 60% starch in the malt and 12% moisture in the grain mixture. On this basis, theoretically, the yield of alcohol should be 3.30 wine gallons of 190° proof alcohol per bushel (56 lbs., 12% moisture) or 42.0 grams of ethanol per 100 grams of dry grain. It is thus apparent that the general average yield secured by conventional grain fermentation noted above is only about 76% of that theoretically obtainable.

There have been occasionally reported laboratory yields from malt converted corn mashes as high as 2.8 wine gallons per bushel or 35.6 grams of ethanol per 100 grams of dry grain. It is a fact, however, that such yields are not generally experienced as averages in current plant operations although in some rare circumstances they may be approached by individual fermenters. It will be noted that even this yield amounts to only about 85% of that which is theoretically expectable.

This inefficiency of conversion has long been recognized and numerous suggestions invoking different methods and expedients have been proposed for increasing the yield of alcohol by such fermentation methods. Among such which have proved in practice to insure an increased yield are methods which involve effective chemical or physical control of the operative conditions so as to minimize losses due to irreversible hydration or retrogradation of the starch during the orthodox step of slow cooling the cooked starch from a temperature of the order of 100° C. down to the optimum saccharification temperature which is about 60° C. and about 55° C. for malt and mold bran respectively.

In prior Patent 2,342,300 one method is described of decreasing such irreversible hydration to non-fermentable carbohydrates with a consequent increased yield in alcohol. This comprises essentially quick or flash cooling through the temperature range at which such starch retrogradation occurs. Another effective method of increasing alcohol yield from a given starchy material is based on the concept of cooking the starchy raw material at a reaction of pH 1.6 to pH 2.5 under such controlled conditions of time and temperatures that only a small amount, and of the order of 10%, of the starch initially present is converted to fermentable sugars after which the mash is mechanically beaten and aerated, neutralized to about pH 5.5 and cooled after which an amylase is added in proper amount, the mash cooled and then fermented.

It was found possible in current commercial processes which involved the concept of quick cooling to obtain yields as high as 34.0 grams of ethanol per 100 grams of dry grains. In laboratory operations using the quick cooling process, alcohol yields from corn are consistently substantially 36.7 grams of ethanol per 100 grams of dry grain when using malt conversion, and at least as good or slightly better yields when employing mold bran saccharification. In extensive experimentation with the acid cooking methods described in Patent 2,348,451 it was found that application of this process to sorghum grains, degerminated corn or degerminated wheat and some other raw materials gave alcohol yields of 3.15 gallons of 190° proof alcohol per bushel of 12 percent. moisture grain or 40.0 grams per 100 grams of total dry grain processed. But applied to whole corn or whole wheat meals the yields were in the order of 15 per cent. lower, or about the same as obtained in the quick cooling process. It became apparent that when utilizing the acid cook some type of inhibitor was formed or released during the acid cooking which evidently functioned to prevent complete saccharification by the enzymatic agents employed. Here again mold bran was more effective than malt but the results still were unsatisfactory.

As a result of intensive experimentation in this field, it has been found that a very substantial improvement in alcohol yield may be secured by a special application of such an acid cooking treatment to cereal grains such as corn. As will be apprehended as the description proceeds, the novel process to be described is based upon the finding that the germ fraction of cereal grains, such as corn, contain constituents which, in some undeterminable manner, reduce the yield of alcohol, possibly by inhibiting the action of the amylase. This discovery of the inhibitory effect of the germ and bran fractions of the grain, more particularly the germ, was made by directly comparing the alcohol yields obtainable from pure starch with those obtainable from whole corn. In these studies on the alcohol fermentation of pure cornstarch, it was ascertained that nearly theoretical yields of alcohol can be obtained by acid cooking the starch, followed by neutralizing and addition of mold bran at optimum saccharification temperature before yeasting. On the other hand, if bran or corn germ either alone or together were added to the starch mashes before cooking with acid, the alcohol yields are very substantially lowered. If the bran or germ, however, was added after the cooking it had no harmful effect on the alcohol yield.

In order to more clearly explain the invention, an illustrative embodiment will be described as applied to corn as the carbohydrate-containing starting material. In such process, as will appear more fully, the corn is first degerminated, either by the "dry" or "wet" process to produce two fractions, namely a germ fraction and a corn fraction. The separation of the germ need not be quantitative or complete and in the description herein a germ fraction connotes a fraction containing approximately 75% of the total original germ and the corn fraction defines an essentially starchy fraction from which 75% of the original germ has been removed, in other words, germ and corn fractions that may readily be obtained by currently employed, well known methods of degermination.

In effectuating the process, the corn, as noted, is first degerminated to produce the two described fractions. This may be accomplished by any suitable degermination method such, for example, as the dry method. In such a method, as is known, the corn is cleaned and while agitated in a suitable container, is sprayed with water or treated with steam to temper the corn, i. e., to raise its moisture content to 20% or thereabouts, after which it is passed to the degerminating machine and is then screened and aspirated. The separated germ material will contain more or less bran and meal depending on the uniformity of the corn and the operation of the degerminator. With such a known process it is easy to obtain, for example, 75 lbs. of degerminated corn and 25 lbs. of corn germ from 100 lbs. of corn. Such a degerminated corn fraction will contain about 1.0 lbs. of oil and the germ fraction will contain about 3.0 lbs. of oil. These figures are not given as being critical but are cited as typical of the products produced by many present mills.

The degerminated corn thus produced was then treated in accordance with the method described in Patent 2,348,451, i. e., it was cooked at a reaction of pH 1.6 to pH 2.5 at such a temperature and for a time sufficient to convert about 10% of the total starch to fermentable sugars, as, for example, at 110° C. for 45 minutes using hydrochloric acid to obtain the desired reaction.

The cooked mash was then quick-cooled to the optimum saccharification temperature after which the acid was neutralized to about pH 5.4 with a suitable neutralizing agent such as calcium carbonate, and mold bran was added in the proportion of about 2.5 grams of mold bran per 100 grams of total dry grain. After saccharification, the mash was inoculated with yeast and fermented in the usual way. It was found that with such a method the ethanol yield was 41.4 lbs. per 100 lbs. of moisture free degerminated corn. On the other hand, when whole corn was converted under the same conditions, the ethanol yield was only 36.1 lbs. per 100 lbs. of moisture free corn.

A portion of the germ fraction separated from the degerminated corn which was procured as above described was separately cooked, saccharified and fermented by the same method and under the same conditions and was found to yield 22.1% ethanol on a moisture free basis.

A second portion of the germ fraction was extracted with hexane to largely remove the contained oil and the residue or cake was then acid cooked, saccharified, and fermented under the same conditions as described above. From this extracted germ the ethanol yield was 24.7% calculated to the original germ fraction on a moisture free basis. The ethanol yields from the oil-containing and the oil-free germ fractions plus those from the degerminated fraction and calculated to the original whole corn were 36.6% and 37.2% respectively.

Tests were then conducted to determine the effects of additions of different percentages of the extracted germ, to the degerminated corn mash. In these tests the corn was degerminated to separate the described germ and corn fractions. The oil was removed from the germ fraction by extraction with a hydrocarbon mixture consisting largely of hexanes, various amounts of the extracted germ were recombined with the degerminated corn fraction and the resulting mixture processed by the method previously described, i. e., by the stated acid cook followed by cooling, neutralization, saccharification with mold bran, and fermentation. The balance of the extracted germ was mashed and fermented separately. The results of these tests, showing the ethanol yield from the different mixtures are tabulated in Table I. The ethanol yields given are calculated as pounds of total ethanol obtained from 75 lbs. of degerminated corn and the cake from 25 lbs. of germ fraction, moisture free basis.

*Table I*

| Percentage of extracted germ recombined with degerminated fraction | Percentage of extracted germ cooked and fermented separately | Total ethanol pounds per 100 pounds of original whole corn, moisture free basis |
|---|---|---|
| 0 | 100 | 37.2 |
| 16 | 84 | 38.1 |
| 25 | 75 | 38.2 |
| 33 | 67 | 39.2 |
| 50 | 50 | 39.6 |
| 60 | 40 | 39.3 |
| 72 | 38 | 39.2 |
| 80 | 20 | 39.1 |
| 90 | 10 | 38.8 |
| 100 | 0 | 37.2 |

A second series of tests were conducted using the same procedure except that the whole germ, without removal of the oil content, was recombined with degerminated corn or was cooked and fermented separately. These tests yielded the data of Table II.

*Table II*

| Percentage of unextracted germ recombined with degerminated fraction | Percentage of unextracted germ cooked and fermented separately | Total ethanol pounds per 100 pounds of original whole corn, moisture free basis |
|---|---|---|
| 0 | 100 | 37.2 |
| 25 | 75 | 37.5 |
| 50 | 50 | 37.0 |
| 75 | 25 | 36.8 |
| 100 | 0 | 36.4 |

From a comparison of the results above tabulated, it is clearly apparent that this step of extracting the oil from the germ removes some constituent or constituents which have an inhibitory or adverse effect upon the subsequent saccharification and fermentation. To further establish this fact degerminated corn, to which refined corn oil was added, was processed in the described manner. It was determined that the refined oil had no adverse effect on alcohol yield. On the other hand, when the "foots" or impurities in the extracted oil were added to degerminated corn and the mixture processed as described, the alcohol yield was materially reduced. It appears that the adverse or depressing effect is associated with the amylolytic process rather than with yeast growth or activity. It has thus been established that the corn germ contains a material which acts as an amylase inhibitor and that this inhibiting substance is soluble in, and therefore removable from the germ by suitable oil solvents such as volatile hydrocarbons, aliphatic alcohols, ethyl ether, acetone, chlorinated hydrocarbons and the like which are but very slightly soluble in corn oil.

From an inspection of the results depicted in Table I it is apparent that it is advantageous to return from the order of from about 30% to 80% of the extracted germ to the degerminated corn fraction prior to cooking and that return of about 50% of the extracted germ insures best results. While not limiting the scope of the invention to any mechanism of the beneficial action resulting from extraction or removal of the inhibitory substances, it is felt that the beneficial effect of returning the extracted germ to the degerminated corn, prior to cooking, is due, at least in some measure, to the return of yeast growth nutrients, including phosphates and other minerals and amino acids.

It will be appreciated that the benefits of the novel findings disclosed herein may be invoked in specifically different processing methods. Thus, as noted, the corn may be degerminated, the germ extracted with a suitable solvent and the extracted germ may be added to the degerminated corn prior to cooking at acid reaction. However, if desired, the germ, after extraction of the oil content, may be cooked separately by the described acid cooking process and then combined with the cooked degerminated corn prior to fermentation.

It is particularly to be observed that to insure the described beneficial effect from return of the extracted germ, it is necessary that the germ fraction be cooked at acid reaction; this beneficial effect is not obtained when the germ is cooked at neutral reaction.

It should also be noted that if for any reason it is not possible or desirable to apply acid cooking to the degerminated corn fraction, the beneficial effect of the separate germ treatment may be obtained by applying the quick cooling or other process that avoids or minimizes starch retrogradation and acid cooking the extracted germ fraction and returning it in the range of concentrations described above. Alcohol yields are not as high as are obtained when both fractions are acid cooked.

Again referring to Table I, it will be noted that as more than 50% of the extracted germ is added to the degerminated corn the alcohol yield progressively decreases. The reason for this is difficult to explain. However, it is felt that there may be present a second type of amylase inhibitor that is insoluble in water, the effect of which becomes marked when more than 50% of the extracted germ is returned to the degerminated corn.

The method of effectuating the invention will have been appreciated from the foregoing description. The corn is first milled in any suitable manner to obtain substantially 75% of a degerminated fraction and a 25% germ fraction which latter contains about 75% of the total corn oil. The germ fraction is then extracted with one of the designated solvents. The "foots" or impurities in the solvent extract should not be returned to the material to be fermented but should be otherwise disposed of as, for example, a cattle feed. If desired, the separated germ may be processed in an Anderson expeller and the press cake then may be extracted with the solvent.

From about 30% to 90% of the extracted germ is then recombined with the degerminated corn and the mixture is cooked at the acid reaction previously described and preferably is mechanically agitated and aerated, neutralized to substantially pH 5.5, cooled, saccharified with a suitable amylase, preferably a suitable fungal amylase, cooled to fermenting temperature and yeasted. The alcohol produced may be recovered by the customary distillation methods. The remainder of the extracted germ may be cooked and fermented separately or may be otherwise disposed of, for example, as a food or feed product. Since the oil has been extracted from this material, it constitutes a readily preservable product.

The extracted oil obviously constitutes a valuable by-product of the operation finding ready markets in the food and pharmaceutical industries since it is rich in vitamin E.

While a preferred method of effectuating the invention has been described, it will be understood that this is given as illustrative of equivalent methods of achieving the advantages of the novel concept, namely, the reduction or elimination of the inhibitory fraction present in whole cereal grains to thus insure an increased alcohol yield.

I claim:

1. A method of producing alcohol which comprises degerminating a cereal grain to produce a germ fraction and a degerminated starchy fraction; extracting the germ fraction with a solvent for the germ oil, adding from about 40% to about 80% of the extracted germ fraction to the degerminated fraction, cooking the combined fractions at an acid reaction, neutralizing the cooked material, cooling to optimum saccharification temperature and saccharifying the cooked mash with a suitable amylase-containing material, cooling the saccharified mash to fermenting temperature, fermenting the mash and recovering the alcohol therefrom.

2. A process in accordance with claim 1 in which the said combined fractions are cooked at a reaction of pH 1.6 to 2.5.

3. A process in accordance with claim 1 in which the amylase-containing material is a fungal amylase.

4. A process in accordance with claim 1 in which the amylase-containing material is a bran substrate containing *Aspergillus oryzae*.

5. A process in accordance with claim 1 in which the amylase containing material is malt.

6. The method of producing alcohol which comprises degerminating corn to produce a germ fraction, and a degerminated starchy fraction; extracting the germ fraction with a solvent for the germ oil, adding from 30% to 90% of the extracted germ fraction to the degerminated fraction, cooking the combined fraction at an acid reaction, neutralizing the cooked material, cooling the cooked mash to optimum saccharification temperature and saccharifying the cooled mash with an amylase-containing material, cooling the saccharified mash to fermenting temperature, fermenting the mash and recovering the alcohol therefrom.

7. A process in accordance with claim 6 in which the combined fractions are cooked at a reaction of pH 1.6 to 2.5.

8. The process in accordance with claim 6 in which the combined fractions are cooked at a reaction of pH 1.6 to 2.5 and for a period of time sufficient to convert substantially 10% of the total starch to fermentable sugars.

9. A method of producing alcohol which comprises degerminating corn to produce a germ fraction and a degerminated starchy fraction; extracting the germ fraction with a solvent for the germ oil, adding from about 30% to 90% of the extracted germ fraction to the degerminated fraction, cooking the combined fractions at an acid reaction of between pH 1.6 and 2.4, reducing the acidity to about pH 5.5, cooling the mash to optimum saccharification temperature and saccharifying the cooled mash with an amylase-containing material, cooling the saccharified mash to fermenting temperature, fermenting the mash and recovering the alcohol therefrom.

10. A process in accordance with claim 9 in which the cooked mash is rapidly cooled to saccharification temperature.

11. A process in accordance with claim 9 in which the said separated germ fraction contains substantially 75% of total oil of the corn.

12. A process in accordance with claim 9 in which the said degerminated fraction constitutes about 75% of the corn.

LEO M. CHRISTENSEN.

References Cited in the file of this patent
UNITED STATES PATENTS

| Number | Name | Date |
|---|---|---|
| 2,132,250 | Wagner | Oct. 4, 1938 |
| 2,135,462 | Boroughs | Nov. 1, 1938 |
| 2,356,218 | Christensen | Aug. 22, 1944 |
| 2,460,389 | Lloyd | Feb. 1, 1949 |
| 2,584,258 | Christensen | Feb. 5, 1952 |